Patented Jan. 17, 1928.

1,656,154

UNITED STATES PATENT OFFICE.

WILLIAM H. ALLEN, OF DETROIT, MICHIGAN.

PROCESS OF TREATING FOULED ENAMEL-REMOVING SOLUTIONS.

No Drawing.    Application filed December 18, 1925. Serial No. 76,338.

The present invention relates to the treatment of solutions used in the removal of enamel, varnish and the like from metal articles.

In the usual commercial process of removing enamels and the like from metals or metal articles, it is customary to submerge the articles in solutions of caustic alkali, usually while heating. Such a treatment results in removal of the enamel or like coating and also results in fouling the solution, so that after several uses there results a thick, tarry locking liquid that is usually thrown away even though, as far as the alkali is concerned, it is far from exhausted. It, however, is practically useless for the purpose of removing coatings because of the large amount of the reaction products produced by action of the alkali on the coating material, these causing the fouling above mentioned.

It is among the objects of the present invention to treat this used solution to restore it to such active condition that it can again be used for removing such coatings.

Another object of the invention is the regeneration of the causticity of the solution.

With these and other objects in view, as will more clearly hereinafter appear, the invention consists in adding to such fouled solutions an agent which will destroy or at least alter the fouling substances so that they no longer interfere with the use of the solution for further removal of coatings or so that any carbonate which has been formed by contact with the air may be recausticized by the use of slaked lime.

A substance having the characteristics required for the above treatment is chlorine gas, and the treatment consists in passing the gas into the foul solution, while agitating, if desired, only a short treatment being usually necessary to clear out the fouling constituents with the production of a clear yellowish solution.

The latter is then preferably causticized by the addition of slaked lime in the conventional manner.

By using the above treatment it is possible to recover and reuse a very large proportion of the caustic alkali originally used with a resulting saving in the cost of removing the coatings.

Having now described the invention and the preferred form of embodiment thereof, it is to be understood that the said invention is to be limited only by the scope of the claim which follows.

I claim:

The process of reactivating alkaline solutions which have become fouled in their use to remove coatings of enamel, lacquer, paint, varnish, or the like which comprises passing free chlorine gas thereinto, drawing off the clear supernatant liquid and causticizing the latter with lime.

WILLIAM H. ALLEN.